(12) United States Patent
Pawlow et al.

(10) Patent No.: US 7,994,236 B2
(45) Date of Patent: Aug. 9, 2011

(54) TECHNIQUE FOR PURIFYING POLYMER COMPOSITIONS

(75) Inventors: James H. Pawlow, Akron, OH (US); William L. Hergenrother, Akron, OH (US)

(73) Assignee: Firestone Polymers, LLC, Akron, OH (US)

( * ) Notice: Subject to any disclaimer, the term of this patent is extended or adjusted under 35 U.S.C. 154(b) by 1319 days.

(21) Appl. No.: 11/304,473

(22) Filed: Dec. 15, 2005

(65) Prior Publication Data

US 2007/0142593 A1 Jun. 21, 2007

(51) Int. Cl.
 *C08F 6/16* (2006.01)
(52) U.S. Cl. ......... 523/310; 524/571; 526/173; 528/482
(58) Field of Classification Search .................. 524/571; 528/482; 523/310; 526/173
 See application file for complete search history.

(56) References Cited

U.S. PATENT DOCUMENTS

| | | | | |
|---|---|---|---|---|
| 4,845,165 A * | 7/1989 | Halasa et al. | ..................... | 526/78 |
| 5,220,100 A * | 6/1993 | Massie et al. | ................. | 585/823 |
| 5,288,849 A * | 2/1994 | Garcin et al. | ................. | 528/482 |
| 5,338,824 A * | 8/1994 | Diaz et al. | ..................... | 528/482 |
| 5,543,472 A | 8/1996 | Stevens et al. | ................. | 525/387 |
| 2003/0181634 A1 * | 9/2003 | Kitano et al. | ................. | 528/482 |
| 2004/0236020 A1 * | 11/2004 | Tsuji et al. | ..................... | 525/99 |

FOREIGN PATENT DOCUMENTS

| | | |
|---|---|---|
| DE | 152792 | 6/1978 |
| EP | 0781782 A1 | 7/1997 |
| WO | WO2005/066222 | 7/2005 |

OTHER PUBLICATIONS

English Abstract of East German Patent No. DD 152792.

* cited by examiner

*Primary Examiner* — Peter D Mulcahy
(74) *Attorney, Agent, or Firm* — Meredith E. Hooker; Arthur M. Reginelli

(57) ABSTRACT

A method for preparing a polymer product, the method comprising polymerizing conjugated diene monomer, optionally together with vinyl aromatic monomer, within a hydrocarbon solvent by employing a lithium-containing initiator, thereby forming a living polymer cement, where about 0.04 to about 0.2 moles of the alkyl lithium initiator per 100 g of the monomer are employed, where the concentration of the monomer within the solvent is about 1 to about 30% by weight, and where the living polymer cement includes a lithium-containing residue, adding a quenching agent to the living polymer cement in an amount sufficient to quench all of the living polymer within the cement, thereby forming a non-living polymer cement, passing the non-living polymer cement through a purification medium, where the purification medium includes alumina, silica, or both, thereby separating at least part of the lithium-containing residue from the polymer cement, collecting the polymer cement after passing the cement through the purification medium, adding an antioxidant, and desolventizing the polymer cement.

45 Claims, No Drawings

TECHNIQUE FOR PURIFYING POLYMER COMPOSITIONS

FIELD OF THE INVENTION

One or more embodiments of the present invention relate to techniques for purifying polymer compositions.

BACKGROUND OF THE INVENTION

Synthetic polymers are often prepared by employing metal-containing initiators, catalysts, and co-catalysts. The quantity or level of metal employed, however, is often small and therefore the residue of these metal compounds often remains within the resulting polymeric composition.

In certain applications, however, the presence of even small amounts of metal compounds may not be desirable. This may be particularly true where the appearance or optical properties of the polymer are critical to their use. For example, it may be desirable for the polymer to be clear and deflect a minimum amount of light. For example, where polymeric compositions are employed in the manufacture of food containers, such as bottles, it is often desirable for the container to exhibit clarity so that the food or beverage can be readily viewed.

In certain situations, however, the presence of small amounts of metal compounds, as well as certain organic compounds, may have a deleterious impact on this clarity. In particular, certain metal compounds may deflect or absorb light and thereby result in polymeric compositions that appear hazy, cloudy, or possess undesirable color. Likewise, in electronic applications, it may be desirable for polymers employed therein to be free of or include less than appreciable amounts of metal.

There is therefore a need to provide a method for reducing the quantity of metal found within many synthetic polymers. For example, there is a need to reduce the amount of lithium located in low molecular weight, anionically polymerized polymers, which include higher amounts of metal due to the fact that the amount of metal employed in polymerization is inversely related to the molecular weight of the polymer synthesized.

SUMMARY OF THE INVENTION

One or more embodiments of this invention provide a method for preparing a polymer product, the method comprising polymerizing conjugated diene monomer, optionally together with vinyl aromatic monomer, within a hydrocarbon solvent by employing a lithium-containing initiator, thereby forming a living polymer cement, where about 0.04 to about 0.2 moles of the alkyl lithium initiator per 100 g of the monomer are employed, where the concentration of the monomer within the solvent is about 1 to about 30% by weight, and where the living polymer cement includes a lithium-containing residue, adding a quenching agent to the living polymer cement in an amount sufficient to quench all of the living polymer within the cement, thereby forming a non-living polymer cement, passing the non-living polymer cement through a purification medium, where the purification medium includes alumina, silica, or both, thereby separating at least part of the lithium-containing residue from the polymer cement, collecting the polymer cement after passing the cement through the purification medium, adding an antioxidant, and desolventizing the polymer cement.

One or more embodiments of the present invention also provide a method for providing a polymer product, the method comprising providing a polymer solution, where said polymer solution includes a polymer, a solvent, and an impurity, where the polymer is characterized by a number average molecular weight of from about 0.5 kg/mole to about 25 kg/mole, contacting the polymer solution with a purification medium, collecting the polymer solution after it has contacted the purification median.

DETAILED DESCRIPTION OF ILLUSTRATIVE EMBODIMENTS

One or more embodiments of the present invention include a method for purifying certain polymer compositions. In one or more embodiments, these polymer compositions include liquid polymers or polymers characterized by relatively low molecular weight. According to one or more embodiments, the polymer compositions can be purified by contacting the polymer composition with a purification medium. In one or more embodiments, the purifying medium may separate one or more impurities from the polymer composition, thereby providing a polymer composition having a desirable appearance. In these or other embodiments, the method of this invention may produce purified polymers acceptable for food or electronic uses.

In one or more embodiments, the method of the present invention includes contacting a polymer cement with a purification medium. The polymer cement may include polymer, a solvent, and one or more impurities.

In one or more embodiments, the polymer within the polymer cement may include polymer characterized as liquid polymer. In these or other embodiments, the polymer may be characterized by a weight average molecular weight of from about 0.5 kg/mole to about 30 kg/mole, in other embodiments from about 1 kg/mole to about 20 kg/mole, and in other embodiments from about 2 kg/mole to about 15 kg/mole. In these or other embodiments, the polymer may be characterized weight average molecular weight that is less than 30 kg/mole, in other embodiments less than 20 kg/mole, and in other embodiments less than 15 kg/mole; and these are other embodiments, the polymer may be characterized by a weight average molecular weight that is greater than 1 kg/mole, in other embodiments greater than 2 kg/mole, and in other embodiments greater than 5 kg/mole. In one or more embodiments, the polymer may be characterized by a molecular weight distribution that is less than 5, in other embodiments less than 2, and in other embodiments less than 1.5. In these or other embodiments, the molecular weight may be determined by using Gel Permeation Chromatography (GPC) calibrated with polystyrene standards and adjusted for the Mark-Houwink constants for the polymer in question.

In one or more embodiments, the polymer may include a polydienyl polymer or polydienyl copolymer. In one or more embodiments, the polymer includes polybutadiene, polyisoprene, poly(styrene-co-butadiene), poly(styrene-co-butadiene-co-isoprene), poly(isoprene-co-styrene), and poly(butadiene-co-isoprene). In these or other embodiments, the polymer may be characterized by a glass transition temperature ($T_g$) of less than 0° C., in other embodiments less than −20° C., and in other embodiments less than −30° C. In one or more embodiments, the polymer may exhibit a single glass transition temperature.

In one or more embodiments, the polymer may include a functional group. The functional group may include a hetero atom or a hetero atom-containing substituent. The functional group may be located at the head of the polymer (e.g., the initiator residue), pendent to the backbone of the polymer, at the terminal end of the polymer (e.g., at the location of termination), or a combination thereof. In one or more embodiments, the functional groups may include hydroxyl groups, carboxyl groups, amino groups, alkyl tin groups, alkyl silane groups, and mixtures thereof.

The polymers employed in the practice of this invention may include polymers prepared by employing numerous polymerization techniques. These techniques may include cationic and anionic techniques, transition metal or coordination catalyst techniques, emulsion techniques, or any other method that results in metal residue (e.g., catalyst or co-catalyst residue) within the final polymer product.

In one or more embodiments, the polymer within the polymer cement may include polymer prepared by anionic polymerization techniques. According to these techniques, polymers may be formed by reacting anionic initiators with certain unsaturated monomers to propagate a polymeric structure. Throughout formation or propagation of the polymer, the polymeric structure may be anionic and "living." In other words, a carbon anion is present. A new batch of monomer subsequently added to the reaction can add to the living ends of the existing chains and increase the degree of polymerization. A living polymer, therefore, may include a polymeric segment having an anionic, reactive end. Anionic polymerization is further described in George Odian, *Principles of Polymerization*, ch. 5 ($3^{rd}$ Ed. 1991), or Panek 94 J. Am. Chem. Soc., 8768 (1972), which are incorporated herein by reference. Reference to anionically polymerized polymers or anionically polymerized living polymers refer to those polymers prepared by anionic polymerization techniques.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers can be used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, N-lithium dihydro-carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, 5,786,441, and International Publication No. WO 2004/020475, which are incorporated herein by reference. In one or more embodiments, the initiator employed imparts a functional group at the head of the polymer chain. The functional group may react or interact with rubber or rubber fillers or otherwise have a desirable impact on filled rubber compositions or vulcanizates.

The amount of initiator employed in conducting anionic polymerizations can vary based upon the desired polymer characteristics. In one embodiment, from about 3 to about 200, and in other embodiments from about 6 to about 100 mmol of lithium per 100 g of monomer is employed.

The polymers employed in the practice of this invention may also include those prepared by employing a multi-functional initiator. The use of multi-functional initiators in anionic polymerization is generally known as described in U.S. Pat. No. 3,652,516, which is incorporated herein by reference. In certain embodiments, the polymers are prepared by employing a di-lithio initiator such as one prepared by reacting 1,3-diisopropenylbenzene with sec-butyllithium.

In other embodiments, the polymers may be prepared by an alternate anionic technique that employs a radical anion initiator. These techniques are generally known in the art as described in U.S. Pat. No. 5,552,483, which is incorporated herein by reference. In one embodiment, the radical anion polymerization technique employs a naphthalene anion-radical that is believed to transfer an electron to a monomer such as styrene to form a styryl radical-anion. The naphthalene anion-radical can be formed by reacting an alkali metal, such as sodium, with naphthalene. In one or more embodiments, the styryl radical-anion dimerizes to form a dicarbanion. It is believed that the addition of additional monomer converts the dicarbanion to a di-living polymer.

Anionic polymerizations may be conducted in a polar solvent such as tetrahydrofuran (THF), or in a non-polar hydrocarbon such as the various cyclic and acyclic hexanes, heptanes, octanes, pentanes, their alkylated derivatives, and mixtures thereof, as well as benzene.

In order to promote randomization in copolymerization and/or to control vinyl content, a polar coordinator may be added to the polymerization ingredients. These randomizers may be used in amounts up from about 0.01 to about 90, in other embodiments from about 0.1 to about 5, or in other embodiments from about 0.2 to about 1.0 equivalents per equivalent of lithium. The amount may depend on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis(2'-tetrahydrofuryl) propane, di-piperidyl ethane, dipiperidyl methane, hexamethylphosphoramide, N—N'-dimethylpiperazine, diazabicyclooctane, dimethyl ether, diethyl ether, tributylamine and the like. Linear and cyclic oligomeric oxolanyl alkane modifiers are described in U.S. Pat. No. 4,429,091, which is incorporated herein by reference.

Anionically polymerized living polymers can be prepared by either batch, semi-batch, or continuous methods. A batch polymerization may be begun by charging a blend of monomer(s) and normal alkane solvent to a suitable reaction vessel, followed by the addition of the polar coordinator (if employed) and an initiator compound. The reactants can be heated to a temperature of from about 20 to about 130° C. and the polymerization may be allowed to proceed for from about 0.1 to about 24 hours. This reaction can produce a reactive polymer having a reactive or living end. In one or more embodiments, at least about 30% of the polymer molecules contain a living end, in other embodiments at least about 50% of the polymer molecules contain a living end, and in other embodiments at least about 80% contain a living end.

In one or more embodiments, the living polymer may be quenched, coupled, or terminated. This may include deactivation of the living polymer or residual initiator compounds. Quenching can be accomplished by contacting the living polymer with a proton or proton source. Proton sources may include water, alcohol (e.g., isopropyl alcohol), and organic acids. In lieu of or in addition to quenching the living polymer, terminating or coupling agents may be reacted with the living polymer. Examples of coupling agents include tin tetrachloride, tetraethyl orthosilicate, tetraethoxy tin, and silicon tetrachloride. Types of terminating agents include functionalizing agents. Types of compounds that have been used to end-functionalize living polymers include carbon dioxide, benzophenones, benzaldehydes, imidazolidones, pyrolidinones, carbodiimides, ureas, isocyanates, and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Specific examples include trialkyltin halides such as tributyl tin chloride, as disclosed in U.S. Pat. Nos. 4,519,431, 4,540,744, 4,603,722, 5,248,722, 5,349,024, 5,502,129, and 5,877,336, which are incorporated herein by reference. Other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference. Additional examples include sulfur-containing or oxygen containing azaheterocycles such as disclosed in WO 2004/020475, U.S. Ser. No. 60/644,164 and U.S. Pat. No. 6,596,798, which are incorporated herein by reference. Other examples include boron-containing terminators such as disclosed in U.S. Ser. No. 60/591,065, which is incorporated herein by reference. Still other examples include cyclic siloxanes such as hexamethylcyclotrisiloxane, including those disclosed in co-pending U.S. Ser. No. 60/622,188, which is incorporated herein by reference. Further, other examples include $\alpha$-halo-$\omega$-amino alkanes, such as 1-(3-bromopropyl)-2,2,5,5-tetramethyl-1-aza-2,5-disilacyclopentane, including those disclosed in co-pending U.S. Ser. Nos. 60/624,347 and 60/643,653, which are incorporated herein by reference.

In one or more embodiments, the living polymer is terminated with a compound that will impart a hydroxyl group to the end of the polymer. Hydroxyl-functionalized anionically-polymerized polymers may be formed by terminating living polymer with an alkylene oxide (i.e., epoxide) such as ethylene oxide or propylene oxide.

The polymer molecules are non-living at the time that they are purified according to one or more embodiments of the present invention. In other words, the polymers do not include a carbanion at the time of purification. These polymers may be referred to as quenched or terminated polymers.

In one or more embodiments, the polymer cement, which may also be referred to as polymer solution, includes a polymer dissolved in a solvent, a polymer suspended in a solvent, or a combination thereof.

In one or more embodiments, useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. In these or other embodiments, useful solvents also include polar solvents. Examples of polar solvents include tetrahydrofuran (THF), dimethyl ether, triethylamine, dioxane, and dibutyl ether.

In one or more embodiments, the concentration of polymer within the cement may be from about 1 to about 50, in other embodiments from about 5 to about 25, and in other embodiments from about 7 to about 15 percent by weight polymer based upon the total weight of the cement.

In one or more embodiments, the solvent may include a polar and non-polar component. This may be useful in adjusting the relative elutropic strength of the solvent with respect to the purification medium. The purification of certain polymers, particularly functionalized polymers, may advantageously be facilitated by adjusting the relative elutropic strength of the solvent. Techniques for adjusting the relative strength of solvents with respect to various purification media have been listed as an elutropic series; See, *The Chemist's Companion, A Handbook of Practical Data, Techniques, and References* by Gordon and Ford.

In one or more embodiments, the volume percent of polar solvent within the overall blend may be from 0 to about 50%, in other embodiments from 3 to 40%, and in the other embodiments from about 5 to 20% based on the total volume of the solvent.

The polymer cement may contain one or more impurities. In one or more embodiments, these impurities may include metals or metal compounds. Exemplary metal compounds include metal oxides, metal halides, metal carbonates, metal hydroxides, metal carboxylates, metal salts, and mixtures thereof. In one or more embodiments, these metal compounds may derive from catalysts, co-catalysts, end-capping agents, modifiers, and mixtures thereof.

In one or more embodiments, impurities include catalyst residues. These catalyst residues may include excess catalyst ingredients or by-products remaining from the polymerization of the polymer. These ingredients or by-products may include metals or metal-containing compounds.

In one or more embodiments, the impurities include lithium or lithium-containing compounds. These compounds may include excess ingredients or by-products of anionic polymerization initiators. Exemplary by-product compounds include lithium halides (e.g., lithium chloride), lithium hydroxide, lithium alkoxide, lithium oxide, and mixtures thereof.

The concentration of metals or metal-containing compounds within the polymer cement may vary based on a number of factors including the polymerization conditions employed in preparing the polymer. For example, where the polymer cement includes lithium or lithium-containing compounds, the polymer cement may include from about 15,000 ppm to about 200 ppm, in other embodiments from about 10,000 ppm to about 250 ppm, and in other embodiments from about 5,000 ppm to about 500 ppm lithium based upon the total weight of the polymer within the cement. In these or other embodiments, the polymer cement may contain from about 0.2 to about 750 mmol per liter, in other embodiments from about 1 to about 600 mmol per liter, and in other embodiments from about 2 to about 500 mmol of metal per liter of cement, where the liters of cement includes both the volume of the polymer and the solvent.

In one or more embodiments of the present invention, the polymer cement may be contacted with a purification medium. Contacting the polymer with a purification medium may include passing the polymer cement through a purification medium.

In one or more embodiments, the purification medium may include an absorption medium. Absorption media include porous media that can absorb or collect certain compounds on or within the media while allowing other compounds or atoms to pass. The mechanism by which the absorption media may absorb or collect these compounds or atoms may include chemical or physical forces. The chemical forces may include ionic bonding or covalent bonding. The physical forces may include hydrogen bonding or Van der Waals forces of attraction.

In one or more embodiments, the purification medium may include silica. Silica may include both natural and synthetic silica. Examples of natural silica include sand, quartz, flint, and diatomite. In these or other embodiments, silica may include amorphous fume silica, fumed silica, fused silica, and silica gel.

In one or more embodiments, silica gel may be employed as the purification medium. Silica gel may include amorphous hydrated silica or sililic acid. In these or other embodiments, silica gel may include a regenerative adsorbent consisting of amorphous silica.

In one or more embodiments, silica gel may be characterized by an average particle size (i.e., average particle diameter) of from about 40 to about 4,000 µm, in other embodiments from about 100 to about 3,000 µm, and in other embodiments from about 250 to about 1,000 µm. In other embodiments, the silica gel may be in the form of spheres or beads that have a larger particle size. For example, the particle size of the spheres or beads may be from about 1 to about 30 mm, in other embodiments from about 2 to about 25 mm, and in other embodiments from about 3 to about 10 mm. The silica gel may also be characterized by including pores within the silica particles. These pores may be characterized by an average size (diameter) of from about 2 to about 200 nm, in other embodiments from about 3 to about 100 nm, and in other embodiments from about 4 to about 10 nm. In one or more embodiments, the pores may be smaller than the average hydrodynamic volume of the polymer within the solvent. In these or other embodiments, the silica gel may also be characterized by including water of hydration. In one or more embodiments, the concentration of hydrated water may be less than 30, in other embodiments less than 10, in other embodiments less than 5, and in other embodiments less than 2 percent by weight of the gel. In one or more embodiments, the gel is substantially devoid of water, or in other embodiments an amount of water that has no appreciable impact on the gel.

In one or more embodiments, the purification medium may include alumina. Alumina may include activated alumina and alumina gel, which may also be referred to as aluminum hydroxide gel or hydrous aluminum oxide.

In one or more embodiments, alumina gel may be characterized by an average particle size (i.e., average particle diameter) of from about 50 to about 200 µm, in other embodiments from about 60 to about 150 µm, and in other embodiments from about 70 to about 100 µm. In other embodiments, the alumina gel may be in the form of spheres or beads that have a larger particle size. For example, the particle size of the spheres or beads may be from about 1 to about 30 mm, in other embodiments from about 2 to about 25 mm, and in other embodiments from about 3 to about 10 mm. The alumina gel may also be characterized by including pores within the alumina particles. These pores may be characterized by an average size (diameter) of from about 1 to about 10 nm, in other embodiments from about 2 to about 8 nm, and in other embodiments from about 4 to about 6 nm. In one or more embodiments, the pores may be smaller than the average hydrodynamic volume of the polymer within the solvent. In these or other embodiments, the alumina gel may also be characterized by including water of hydration. In one or more embodiments, the concentration of hydrated water may range from about 0 to about 20, in other embodiments from about 1 to about 18, and in other embodiments from about 2 to about 10 percent by weight water.

In one or more embodiments, it may be advantageous to treat the alumina with water or other compounds that can be used to partially deactivate the alumina. The purification of certain polymers, particularly functionalized polymers, may advantageously be facilitated by partially deactivating the alumina.

In other embodiments, the purification medium may optionally include magnesium silicate, magnesia, carbon or carbon black, such as activated carbon, diatomaceous earth, molecular sieves, or combinations thereof. These other purification media may be used with or in lieu of silica and/or alumina. In one or more embodiments, the purification medium includes a polar media. In these or other embodiments, the purification media is devoid of non-polar media. For example, in one or more embodiments, the purification media may be devoid of crosslinked polystyrene or other crosslinked hydrocarbon polymers.

The polymer cement may be contacted with the purification medium for various time intervals, which intervals may vary based on a variety of conditions. In one or more embodiments, the polymer cement may be contact with the purification medium for about 0.1 to about 60 minutes, in other embodiments for about 0.5 to about 40 minutes, and in other embodiments for about 1 to about 20 minutes.

The conditions under which the polymer cement may be contacted with the purification medium may vary based upon a variety of factors. In one or more embodiments, the pressure under which the polymer cement may be passed through the purification medium may be from about 100 to about 1,000 kPa, and in other embodiments from about 110 to about 500 kPa. In these or other embodiments, the temperature at which the polymerization medium may be while passed through the purification medium may be from about 0 to about 100° C., and in other embodiments from about 25 to about 60° C.

In one or more embodiments, the polymer cement may be gravity fed or pumped through a packed column at standard conditions. The packed column may include one or more purification media. In one or more embodiments, the packed column may include two or more distinct purification media. In one embodiment, the distinct purification media may be segregated into zones. For example, in one embodiment, the packed column may include a first zone that includes a silica or alumina gel and a second zone that includes carbon black.

The overall characteristics of the column may vary based upon numerous factors. In one or more embodiments, the aspect ratio of the column may be from about 100:1 to about 1:1, and in other embodiments from about 20:1 to about 2:1.

Once the cement has been contacted with the purification medium, a variety of techniques, including those known in the prior art, can be employed to collect the polymer cement.

Once the polymer cement has been collected, other compounds or ingredients can be added to the polymer cement. For example, one or more antioxidant compounds can be added. Examples of antioxidants include hindered phenols. In one or more embodiments, the amount of antioxidant may be from about 0.05 to about 2, and in other embodiments from about 0.1 to about 1, and in other embodiments from about 0.2 to about 0.8 percent by weight based on the weight of the polymer.

The polymer can be recovered from the polymer cement (i.e., the polymer may be separated from the solvent) by using conventional procedures of desolventization and drying. For instance, the polymer can be recovered by subjecting the polymer cement to drying under reduced pressure. Alternatively, the polymer may be directly dried by employing a wiped film evaporator. Alternatively, the polymer may be recovered by directly drum-drying the polymer cement. In one or more embodiments, the content of volatile substances in the dried polymer may be below 5, in other embodiments below 2, and in other embodiments below 1 weight percent.

The purified polymers prepared by using methods of the present invention may be useful in the food industry, pharmaceutical industry, and the electronic industry. For example, food or beverage bottles, packaging, and oxygen scavenging resins may be prepared from the purified polymers prepared according to the present invention. Uses in the electronics industry may include gaskets for electronic appliances.

In order to demonstrate the practice of the present invention, the following examples have been prepared and tested. The examples should not, however, be viewed as limiting the scope of the invention. The claims will serve to define the invention.

EXAMPLES

Samples 1-8

Eight polymer samples were purified according to the following. Each of the polymers were prepared by anionic polymerization techniques by polymerizing 1,3-butadiene by employing an n-butyllithium initiator in hexanes. The initiator loading was about 40 mmol of lithium per 100 g of monomer. The amount of THF randomizer was varied in each sample to produce polymers having differing vinyl content. The polymers were quenched with isopropanol to produce liquid polymers having a number average molecular weight of about 2.4 to about 2.8 kg/mole, and a molecular weight distribution of about 1.08 to about 1.24. The polymer product in solution was characterized by a yellow, hazy color.

The liquid polymer products, which were contained in 500 mL of a 10 weight percent hexane solution, were passed through a packed column containing about 120-125 grams of silica gel. The column had an inner diameter of about 2 inches, and the column was packed with about 4 inches of the gel. The gel included silica particles having an average diameter of from about 30 to about 75 μm, and the particles included pores having a diameter of about 6 nm.

The polymer product was collected after passage through the column. The recovered product was clear and colorless. The resultant samples were analyzed for lithium content by inductively coupled plasma optimal emission spectroscopy (ICP-OES). Table I sets forth the vinyl content of the various polymers as well as the amount of lithium observed after purification. It is noted that the weight of lithium contained within the polymer samples prior to purification was calculated to be about 2,800 ppm lithium, which calculated amounts were spot checked using the same analytical procedures employed to analyze the purified product.

TABLE I

| Polymer Sample | % Vinyl | PPM Li (after purification) |
|---|---|---|
| 1 | 9.2 | 0.1 |
| 2 | 62.0 | 0.6 |
| 3 | 79.5 | <0.05 |
| 4 | 29.3 | 0.08 |
| 5 | 39.4 | 25 |
| 6 | 45.0 | 2.4 |
| 7 | 12.8 | 19.7 |
| 8 | 17.0 | 1.3 |

Samples 9-16

Di-functional polymers were purified as follows. The di-functional polymers were prepared by anionically polymerizing di-living polymer by employing a diisopropenyl benzene-based di-functional initiator. The catalyst loading was about 65 mmol of lithium (2 mmol per mole of initiator) per 100 g of 1,3-butadiene monomer employed in the polymerization, which was conducted in hexanes. The polymerization was conducted in the presence of about 150 modes of randomizer per 100 g of monomer, which tailored the vinyl content of the polymers to about 50%. The polymers were terminated with ethylene oxide to yield dihydroxy polybutadiene having an average molecular weight of about 3,500 g per mole.

The di-functional polymer product was fractioned into eight samples, each about 500 mL in volume and containing about 10 weight percent polymer product dissolved therein. Each sample was then passed through a packed column containing about 200 grams of alumina gel. The column had an inner diameter of about 2 inches and the column was packed with about 6 inches of gel. Eight distinct alumina gels were employed in each respective column; in other words, each sample was passed through a different alumina gel. Each gel had an average particle size of about 50 to about 210 μm, with an average pore size of about 5.8 nm. Each of the eight gels were distinguished based on water content and pH. The variance in pH derived from the particular alumina gel that was purchased. The water content was achieved by adding water to the alumina gel followed by mixing to achieve adequate dispersion of the water throughout the gel. Table II identifies whether the particular gel employed was basic, neutral, or acidic, and Table II also provides the weight percent water added to the alumina. The acidic gel was characterized by a pH of about 4-5, the neutral gel was characterized by a pH of about 7, and the basic gel was characterized by a pH of about 9-10. Those skilled in the art will also appreciate that those alumina gels containing 3% water are commonly referred to as Grade II alumina gels, those containing 6 weight percent water are commonly referred to as Grade III alumina gels, and those containing 10 weight percent water are commonly referred to as Grade IV alumina gels.

Table II also provides the amount of lithium detected within each sample after the sample was passed through the respective columns. Analysis was performed by using the same techniques employed in Samples 1-8. The calculated amount of lithium within each sample prior to purification was about 4630 ppm, which calculated amount was confirmed by similar analysis.

TABLE II

| Sample No. | PPM Li (after purification) | Alumina | Color (after purification) | Clarity (after purification) |
|---|---|---|---|---|
| 9 | 185 | Grade IV, basic | Lt. yellow | Sl. Hazy |
| 10 | 310 | Grade IV, neutral | Lt yellow | v. sl. Hazy |
| 11 | 8.6 | Grade III, basic | v. pale yellow | Clear |
| 12 | 6 | Grade III, neutral | v. pale yellow | Clear |
| 13 | 127 | Grade III, acidic | Pale yellow | v. sl. Hazy |
| 14 | 24 | Grade II, basic | v. pale yellow | Clear |
| 15 | N/A | Grade II, neutral | v. pale yellow | Clear |
| 16 | N/A | Grade I, neutral | Column clogged | Column clogged |

Various modifications and alterations that do not depart from the scope and spirit of this invention will become apparent to those skilled in the art. This invention is not to be duly limited to the illustrative embodiments set forth herein.

What is claimed is:

1. A method for preparing a polymer product, the method comprising:
    polymerizing conjugated diene monomer, optionally together with vinyl aromatic monomer, within a hydrocarbon solvent by employing a lithium-containing initiator, thereby forming a living polymer cement, where the living polymer cement includes a lithium-containing residue and where the hydrocarbon solvent is selected from the group consisting of aliphatic hydrocarbons and cycloaliphatic hydrocarbons;
    adding a functionalizing agent to the living polymer cement, thereby forming a functionalized polymer cement;
    passing the functionalized polymer cement through a purification medium, where the purification medium includes a partially deactivated alumina, thereby separating at least part of the lithium-containing residue from the polymer cement, where the partially deactivated alumina is selected from the group consisting of Grade II alumina, and Grade III alumina;
    collecting the polymer cement after passing the cement through the purification medium;
    optionally adding an antioxidant; and
    desolventizing the polymer cement.

2. The method of claim 1, where the purification medium further includes magnesium silicate, magnesia, carbon, carbon black, diatomaceous earth, molecular sieves, and combinations thereof.

3. A method for providing a polymer product, the method comprising:
    providing a polymer solution, where said polymer solution includes a functionalized polymer, a solvent, and an impurity, where the polymer is characterized by a number average molecular weight of from about 0.5 kg/mole to about 25 kg/mole, where the solvent is selected from the group consisting of aliphatic hydrocarbons and cycloaliphatic hydrocarbons;
    contacting the polymer solution with a purification medium including partially deactivated alumina, where the partially deactivated alumina includes from 3 wt. % to 6 wt. % water;
    collecting the polymer solution after it has contacted the purification medium.

4. The method of claim 3, where the polymer includes an anionically-polymerized polymer.

5. The method of claim 3, where the polymer solution includes from about 1 to about 50% by weight polymer based on the total weight of the polymer solution.

6. The method of claim 3, where the impurity includes a metal compound.

7. The method of claim 6, where the metal compound includes a lithium-containing compound.

8. The method of claim 7, where the polymer solution includes, prior to said step of contacting, from about 15,000 ppm to about 200 ppm lithium based on the total weight of the polymer within the solution.

9. The method of claim 3, where the polymer is characterized by a number average molecular weight from about 1 kg/mole to about 20 kg/mole.

10. The method of claim 3, where the purification medium further includes silica gel.

11. The method of claim 10, where the silica includes silica gel characterized by an average particle size of from about 40 to about 4,000 micrometers, and where the silica gel includes pores characterized by an average diameter of from about 2 to about 200 nm.

12. The method of claim 10, where the silica includes silica gel characterized by an average particle size of from about 100 to about 3,000 micrometers, and where the silica gel includes pores characterized by an average diameter of from about 3 to about 100 nm.

13. The method of claim 10 where the silica includes a silica gel including pores characterized by an average diameter that is smaller than the average hydrodynamic volume of the polymer within the solvent.

14. The method of claim 3, where the alumina is characterized by an average particle size of from about 50 to about 200 micrometers, and where the alumina includes pores characterized by an average diameter of from about 1 to about 10 nm.

15. The method of claim 3, where the alumina is characterized by an average particle size of from about 60 to about 150 micrometers, and where the alumna includes pores characterized by an average diameter of from about 2 to about 8 nm.

16. The method of claim 3, where the alumina contains pores characterized by an average diameter that is smaller than the average hydrodynamic volume of the polymer within the solvent.

17. The method of claim 3, further comprising the step of contacting the polymer solution with a second purification medium selected from the group consisting of magnesium silicate, magnesia, carbon, carbon black, diatomaceous earth, molecular sieves, or combinations thereof.

18. The method of claim 3, where said step of contacting the polymer solution within a purification medium takes place for about 0.1 to about 60 minutes, at a pressure from about 100 to about 1000 kPa, and a temperature from about 0 to about 100° C.

19. The method of claim 3, where the purification media is included within a packed column.

20. The method of claim 19, where said step of contacting the polymer includes passing the polymer solution through the packed column.

21. The method of claim 20, where said packed column includes a second purification medium.

22. The method of claim 21, where the second purification medium is included within a second zone within a packed column.

23. The method of claim 3, where said step of collecting the polymer solution after it has contacted the purification medium further includes desolventizing and drying the polymer.

24. The method of claim 10, where the silica includes silica gel in the form of beads, and where the beads have an average particle size of from about 1 to about 30 mm.

25. The method of claim 24, where the silica includes silica gel in the form of beads, and where the beads have an average particle size of from about 3 to about 10 mm.

26. The method of claim 3, where the alumina is in the form of beads, and where the beads have an average particle size of from about 1 to about 30 mm.

27. The method of claim 3, where the alumina is in the form of beads, and where the beads have an average particle size of from about 3 to about 10 mm.

28. The method of claim 1, further comprising the step of treating alumina with water or other compounds in order to form the partially deactivated alumina.

29. The method of claim 3, further comprising the step of treating alumina with water or other compounds in order to form the partially deactivated alumina.

30. The method of claim 1, where the partially deactivated alumina is a Grade II alumina.

31. The method of claim 3, where the partially deactivated alumina is a Grade II alumina.

32. The method of claim 1, where the partially deactivated alumina is a Grade III alumina.

33. The method of claim 3, where the partially deactivated alumina is a Grade III alumina.

34. The method of claim 1, where the partially deactivated alumina includes 3 wt % water.

35. The method of claim 3, where the partially deactivated alumina includes 3 wt % water.

36. The method of claim 1, where the partially deactivated alumina includes 6 wt % water.

37. The method of claim 3, where the partially deactivated alumina includes 6 wt % water.

38. The method of claim 1, where the hydrocarbon solvent is an aliphatic hydrocarbon selected from the group consisting of n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits.

39. The method of claim 1, where the hydrocarbon solvent is a cycloaliphatic hydrocarbon solvent selected from the group consisting of cyclopentane, cyclohexane, methylcyclopentane, and methylcyclohexane.

40. The method of claim 3, where the hydrocarbon solvent is an aliphatic hydrocarbon selected from the group consisting of n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits.

41. The method of claim 3, where the hydrocarbon solvent is a cycloaliphatic hydrocarbon solvent selected from the group consisting of cyclopentane, cyclohexane, methylcyclopentane, and methylcyclohexane.

42. The method of claim 1, where the functionalized polymer is a hydroxyl-functionalized polymer.

43. The method of claim 3, where the functionalized polymer is a hydroxyl-functionalized polymer.

44. The method of claim 3, where the functionalized polymer is prepared by terminating a living polymer with carbon dioxide or a tin halide.

45. The method of claim 3, where the polymer solution includes, prior to said step of contacting, from about 0.2 to about 750 mmole of metal per liter of solution.

* * * * *